(No Model.)
C. BUERLING & A. ALLENBERG.
VENT BUNG
No. 550,903.  Patented Dec. 3, 1895.
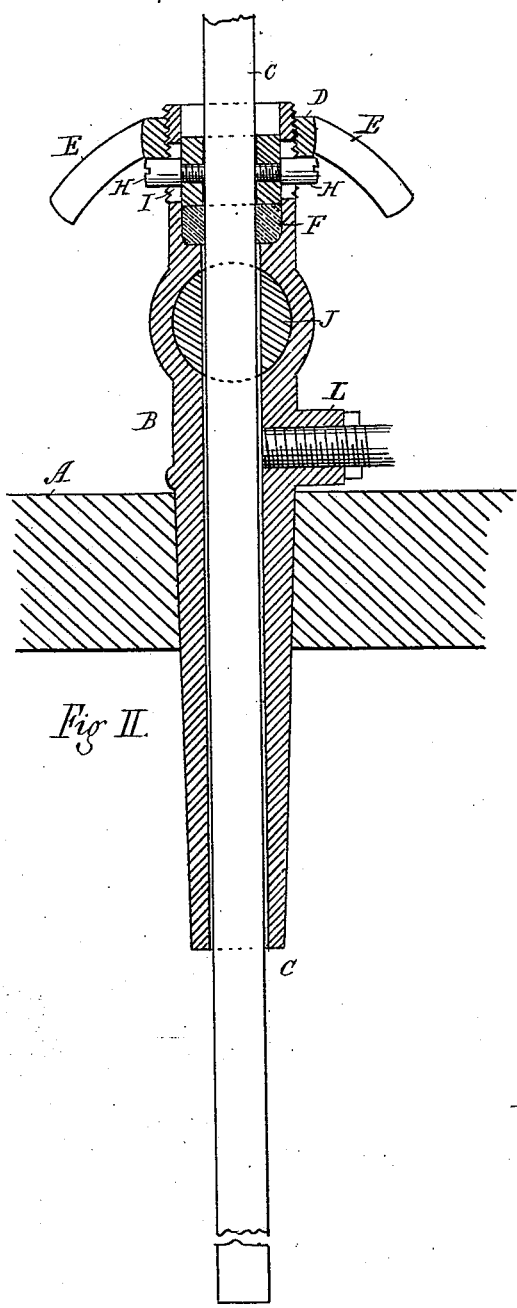
Fig. II.
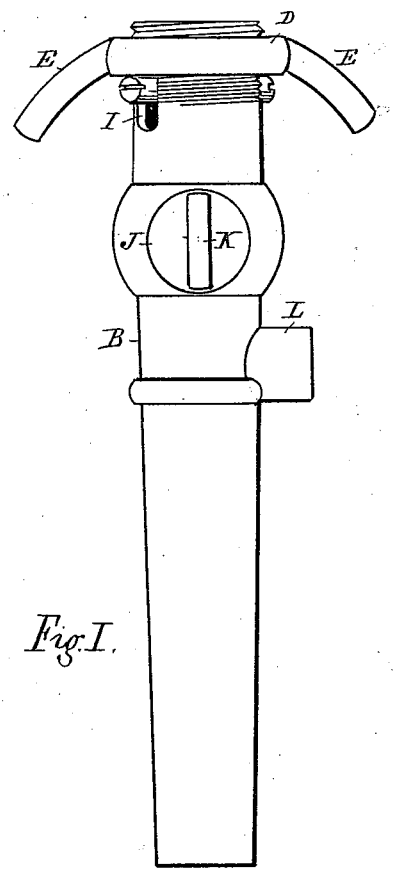
Fig. I.
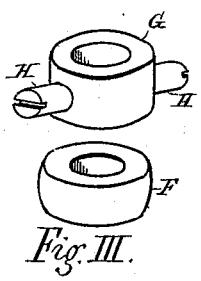
Fig. III.
Witnesses.
R. S. Millar
L. M. Adams
Inventors
C. Buerling & A. Allenberg.
By J. Bailey Atty

UNITED STATES PATENT OFFICE.

CHARLES BUERLING AND ALBERT ALLENBERG, OF CINCINNATI, OHIO; SAID ALLENBERG ASSIGNOR TO HIRAM INGELS, OF SAME PLACE.

VENT-BUNG.

SPECIFICATION forming part of Letters Patent No. 550,903, dated December 3, 1895.

Application filed February 18, 1895. Serial No. 538,847. (No model.)

*To all whom it may concern:*

Be it known that we, CHARLES BUERLING and ALBERT ALLENBERG, citizens of the United States, residing at Cincinnati, in the county of Hamilton and State of Ohio, have invented a new and useful Improvement in Vent-Bungs, which improvement is fully set forth in the following specification and accompanying drawings, in which—

Figure I is a plan view of our improved vent-bung; Fig. II, a central sectional view of the same; Fig. III, a detail view of the gland or compressible collar which encircles the outlet-pipe and the compressing-plug.

Our invention relates to improvements in the construction of vent-bungs of the class generally used in conjunction with ale or beer pumps, and its object is to provide a simple and efficient device designed to facilitate the insertion of the outlet-pipe into barrels of effervescent liquids and to prevent the waste of the contents which generally attends the operation with bungs hitherto employed for the purpose.

Our invention consists in part of a valve which is fixed in the body of the bung, whereby the liquid is prevented from escaping until the bung is driven home and the outlet-pipe prepared for insertion.

Other improvements will be hereinafter described.

Referring to the accompanying drawings, A represents the head of a barrel; B, the bung; C, the outlet-pipe extending through the bung into the barrel. The outer end of the bung is threaded and engages an annular nut D, which is interiorly threaded, provided with arms E, the outer ends of which are bent downwardly in order to avoid injury from the mallet by which the bung is driven into the barrel. It will be observed that these arms form a complete and convenient substitute for a wrench. A gland or compressible collar F, made of rubber or other suitable material, rests on a ledge in the throat of the bung. A hollow plug G rests upon the gland and is provided with threaded studs H, which extend through slots I to the outer side of the head of the bung. A valve J is fixed in the body of the bung immediately beneath the gland and has a transverse orifice, which is adapted to register, when desired, with the bore of the bung. The position of the valve is indicated by its head K. If that be vertical, the valve is open; if transverse the valve is closed. L indicates the air-inlet pipe.

The operation of the device will be readily understood. The bung is driven into the barrel in the usual manner. The valve J being closed no liquid can escape. The end of the outlet-pipe is then introduced. The nut D is turned, causing the gland to contract upon the pipe. The valve being then turned to the proper position the pipe may be thrust into the barrel.

What we claim as new is—

The combination with the bung provided with a valve J, and screw threaded at its upper end and formed with diametrically opposite slots, of the compressible gland, the plug or follower, provided with screw studs which pass through said slots, the nut at the upper end of the bung and the outlet pipe passing through the bung and through the valve gland and follower, substantially as described.

In testimony that we claim the foregoing we have hereunto set our hands, this 9th day of February, 1895, in the presence of witnesses.

CHARLES BUERLING.
ALBERT ALLENBERG.

Witnesses:
FRED T. KUSHMAN.
P. J. DOLAN.